(No Model.) 3 Sheets—Sheet 1.
T. J. GRIFFIN.
COTTON PRESS.
No. 558,171. Patented Apr. 14, 1896.
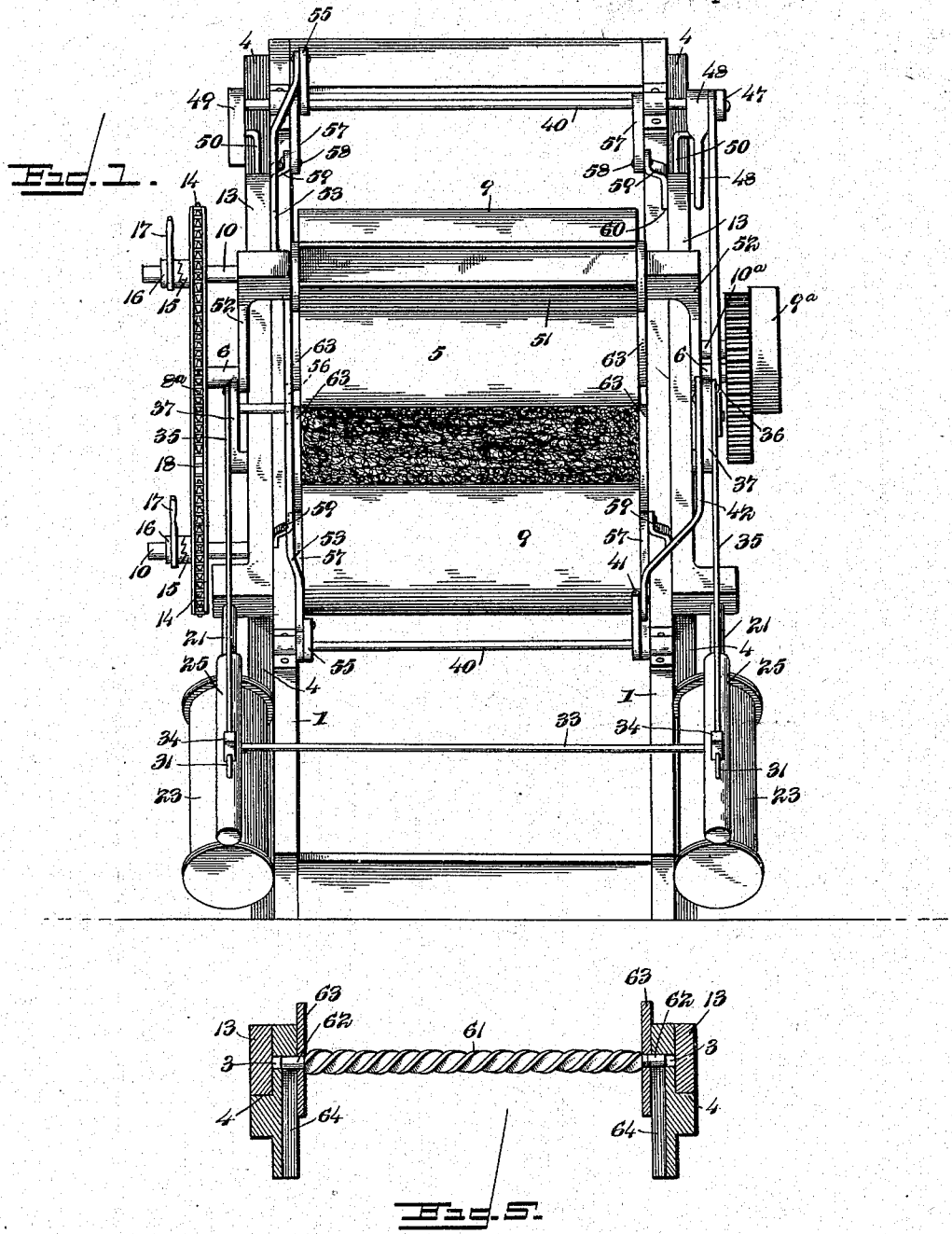
Witnesses
E. K. Stewart
S. P. Wolhaupter
Inventor
Thomas J. Griffin
By his Attorneys,
C. A. Snow & Co.

(No Model.)  T. J. GRIFFIN.  3 Sheets—Sheet 2.
COTTON PRESS.
No. 558,171.  Patented Apr. 14, 1896.
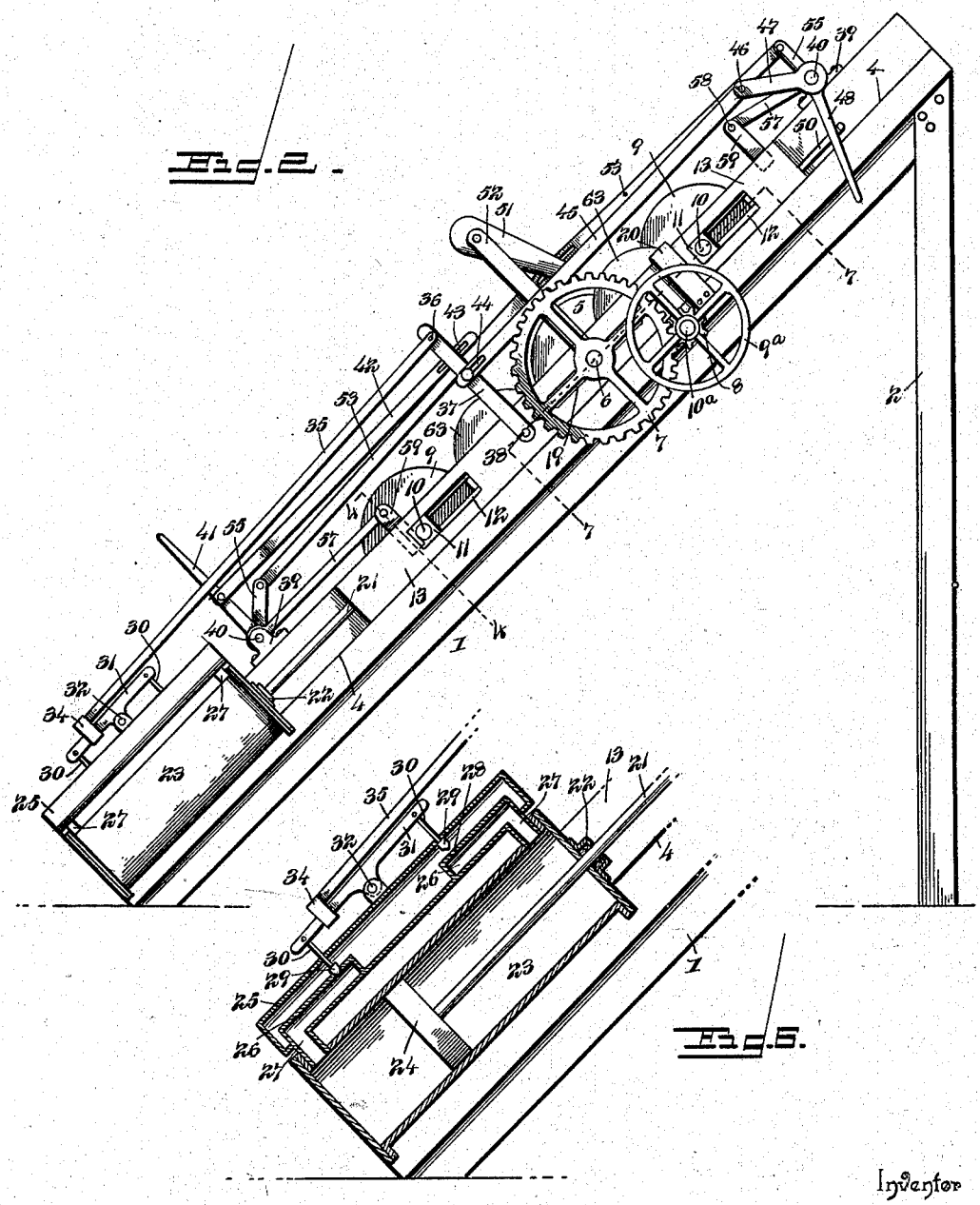
Witnesses
E. N. Stewart
L. P. Wollongton
Inventor
Thomas J. Griffin
By his Attorneys,
C. A. Snow & Co.

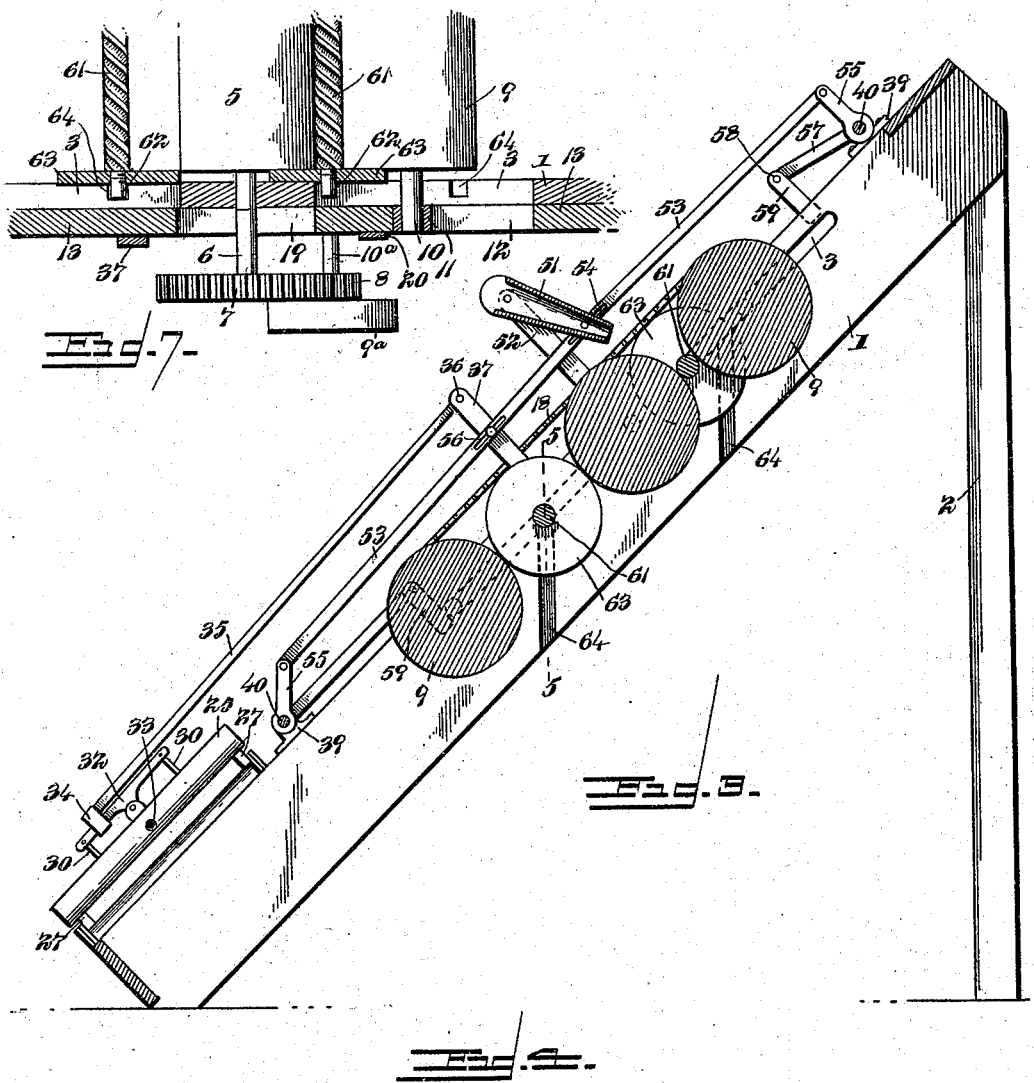

UNITED STATES PATENT OFFICE.

THOMAS J. GRIFFIN, OF GALVESTON, TEXAS, ASSIGNOR OF FOUR-FIFTHS TO H. RIEDEL, HENRY REMBERT, ED. McCARTHY, AND N. WEEKS, OF SAME PLACE.

COTTON-PRESS.

SPECIFICATION forming part of Letters Patent No. 558,171, dated April 14, 1896.

Application filed January 20, 1896. Serial No. 576,215. (No model.)

*To all whom it may concern:*

Be it known that I, THOMAS J. GRIFFIN, a citizen of the United States, residing at Galveston, in the county of Galveston and State of Texas, have invented a new and useful Cotton-Compress, of which the following is a specification.

This invention relates to cotton-compresses; and it has for its object to effect certain improvements in cotton-compresses of that character commonly known as "roller-compresses," which form a cylindrical or roll bale.

To this end the main and primary object of the invention is to provide a compress having a continuous operation, whereby one bale of cotton is being formed by the compress all the time the same is working, and thereby rendering it unnecessary to completely stop the working of the entire press for every single bale made until the bale can be wrapped and discharged out of the press.

With these and other objects in view, which will readily appear as the nature of the invention is better understood, the same consists in the novel construction, combination, and arrangement of parts hereinafter more fully described, illustrated, and claimed.

In the drawings, Figure 1 is a plan view of a cotton-compress constructed in accordance with this invention. Fig. 2 is a side elevation thereof. Fig. 3 is a central longitudinal sectional view thereof. Fig. 4 is a sectional view on the line 4 4 of Fig. 2. Fig. 5 is a similar view on the line 5 5 of Fig. 3. Fig. 6 is an enlarged detail sectional view of one of the pressure-cylinders and the valve mechanism employed in connection therewith. Fig. 7 is a detail sectional view on the line 7 7 of Fig. 2.

Referring to the accompanying drawings, 1 designates the press-frame, constructed in any suitable substantial manner, and in the present invention the said frame is preferably supported at an inclination, with its lower end resting on the floor or bed supporting the press and its upper end sustained in its elevated position by means of upright supporting standards or legs 2, suitably connected at their upper ends to the upper end of the press-frame, as illustrated in the drawings.

The press-frame 1 is provided at both sides of its transverse center and in the opposite sides thereof with oppositely-located longitudinally-disposed guide-slots 3 and at outer upper sides with the longitudinally-disposed slideways 4, the function of which slideways and guide-slots will be more particularly referred to. Arranged transversely within the press-frame 1, at a point intermediate of the upper and lower ends thereof, is the central fixed rotating compressing-roll 5, the shaft extremities 6 of which roll are journaled in opposite sides of the press-frame 1, and one of the shaft extremities 6 of the central fixed compressing-roll 5 has mounted thereon the gear-wheel 7, which meshes with a driving-pinion 8, carried at one side of a belt-wheel $9^a$, mounted on the stub-shaft $10^a$, arranged at one side of the press-frame. The belt-wheel $9^a$ receives the belt for transmitting motion, through the medium of the gearing described, to the central fixed roll 5, and the shaft extremity 6 of such roll opposite the gear-wheel 7 has mounted thereon a chain-wheel $8^a$, which provides means for transmitting motion to the movable rotary compressing-rolls 9, arranged, respectively, at opposite sides of the central fixed roll 5 and within the press-frame.

A pair of the rolls 9 is employed, so that one of said rolls works within the frame 1 at each side of the central fixed compression-roll 5 and is movable toward and away from the roll 5 and also rotates in the same direction and at the same speed as the said roll 5. The rolls 9 are designed to move longitudinally of the frame 1, simultaneously and in the same direction, and are alternately operated in conjunction with the roll 5 to provide for continuously forming one bale within the press during the operation thereof, and by reason of the alternate use of the rolls 9 when one of said rolls is in its nearest possible position to the central fixed roll 5 the other of said rolls is in its position farthest from the roll 5, as clearly illustrated in Fig. 3 of the drawings.

Each of the movable compressing-rolls 9 has its opposite shaft extremities 10 projected through the side guide-slots 3 of the frame and mounted in the movable bearing-boxes 11, slidably mounted in the longitudinally-disposed slots 12, formed in the reciprocating slide-bars 13, registering with and mounted to freely slide within the longitudinally-disposed slideways 4, formed at the opposite outer upper sides of the press-frame 1. The shaft extremities 10 of the movable or negative rolls 9 of the press at one side of the press-frame have loosely mounted thereon the sprocket-wheels 14, each of which sprocket-wheels 14 is provided at one side with a clutch member or hub 15, normally engaged by a clutch-collar 16, feathered on the shaft extremity 10 and controlled by means of a lever 17, suitably connected therewith, whereby the said collar 16 may be readily thrown in and out of engagement with the clutch member or hub carried by the sprocket-wheel 14. A single endless drive-chain 18 passes around the oppositely-located sprocket-wheels 14 for the opposite movable compressing-rolls 9 and also engages with the chain-wheel 8ª, which chain-wheel 8ª therefore provides means, through the medium of the chain-wheel 8ª, for positively transmitting motion to the movable compressing-rolls 9, as clearly illustrated in the drawings.

The opposite reciprocating slide-bars 13, mounted to slide on the frame at opposite sides thereof, provide for simultaneously moving the rolls 9 longitudinally of the frame 1, and said slide-bars 13 are permitted the necessary reciprocatory play by providing the same intermediate of their ends with the longitudinally-disposed slots 19, which freely work over the shaft extremities 6 of the central roll 5, so that such shaft extremities 6 will not interfere with the free reciprocation of the slide-bars. The slide-bars 13 are retained within the slideways 4 of the frame sides by means of suitable guide-loops 20, attached to the frame sides and embracing the slide-bars, and at their lower ends the slide-bars 13 have suitably connected therewith the outer upper ends of the piston-rods 21, working through the stuffing-boxes 22 at one end of the pressure-cylinders 23 and connected at their inner ends, within said cylinders, with the pistons 24.

The pressure-cylinders 23 are mounted in a fixed position at opposite sides of the frame, and at the lower end thereof, and each of said cylinders supports on the upper side thereof a valve-chest 25, within which are arranged separate inclosed water-chambers 26, respectively arranged within opposite ends of the chest and having fluid-passages 27, respectively communicating with the interior of the cylinder, at the opposite ends thereof. Each of the water-chambers 26 is provided in its upper side with a beveled valve-opening 28, within which is adapted to work the lower pointed end of the pointed valve-plug 29. By reason of this arrangement a valve-plug is provided in connection with each water-chamber 26, and said plugs are provided with stems 30, extended through the top of the chest 25 and pivotally connected to opposite ends of the oscillating valve-lever 31, pivotally supported at a point intermediate its ends, as at 32, above the valve-chest 25. The oppositely-located valve-chests 25 are connected together by an intermediate circulating-pipe 33, which provides for an even distribution of the water or oil employed within each pressure-cylinder, and thereby insures the maintenance of the same pressure within the said cylinders.

The oscillating valve-lever 31 for the valves of each of the opposite valve-chests has mounted thereon a sliding weight 34, which is arranged to slide the entire length of the valve-lever between the connection of the valve-stems 30 therewith, and the said sliding weight 34 has connected thereto one end of an adjusting-rod 35, the other end of which rod is pivotally connected at 36 to the upper extremity of an arm 37, pivotally connected at its lower end, as at 38, to the outer side of one of the reciprocating slide-bars 13, thereby completing a connection between the said slide-bars and the valve-levers 31, whereby the movement of said slide-bars will provide for the proper opening and closing of the valves employed in connection with the water-chambers 26.

Mounted in suitable bearing-boxes 39, near opposite ends of the press-frame 1, are the transverse oppositely-located rock-shafts 40. The lower of said rock-shafts 40 has attached thereto the lower end of an adjusting-lever 41, to which adjusting-lever is pivotally connected one end of an adjusting-rod 42, the other end of which adjusting-rod 42 has a slotted connection 43 with the arm 37, carried by one of the slide-bars 13, and this same arm 37 also has a slotted connection 44 with one end of a second adjusting-rod 45, the other upper end of which second adjusting-rod 45 is pivotally connected at 46 to a short rock-arm 47, mounted on one extremity of the upper of said rock-shafts 40, and directly at one side of the adjusting-lever 48 for said upper rock-shaft. The adjusting-lever 48 is arranged to work at one side of the press-frame and also operates as a tappet-arm in connection with a tappet-arm 49, mounted on the extremity of the upper rock-shaft 40 opposite the extremity to which the lever 48 is connected, and the said lever 48 and the arm 49 are adapted to work against the angled adjusting-pins 50, projected from the upper ends of the slide-bars 13, to provide for an upward adjustment of said slide-bars at a certain stage in the operation of the press, as will be fully described.

The bat of cotton is fed to either side of the central fixed roll 5 through a swinging feed-spout 51, which is pivotally swung between a pair of supporting-standards 52 at opposite sides of the frame 1 and is arranged to swing directly over the central fixed roll 5. Separate adjusting-rods 53 have a slotted connection at one end, as at 54, to one end of the feed-spout 51, and the other ends of said rods 53 are respectively pivoted to the rock-arms 55, fitted on the upper and lower rock-shafts 40, so that when either of said rock-shafts is oscillated by manipulating the adjusting-lever therefor the spout 51 will be swung on its pivot so as to dispose its lower end at either side of the roll 5, whereby the cotton delivered into the feed-spout from the condenser will be evenly fed to the core between one of the movable or negative rolls 9 and the central fixed roll 5. One of the said adjusting-rods 53 affords means for adjusting the arm 37 opposite the arm having the rod connections 42 and 45 therewith, and to provide for such adjustment of the arm 37 referred to the said arm 37 has a pin-and-slot connection 56 with one of said rods 53, as clearly illustrated in Figs. 1 and 3 of the drawings.

In connection with the upper and lower rock-shafts 40 is employed a pair of short adjusting-arms 57. The adjusting-arms 57 on each of the rock-shafts 40 are located, respectively, near opposite ends of the shaft and are pivotally connected at 58 to the upper ends of the stop-plates 59, adapted to work in the plate-recesses 60, formed between the outer side of the press-frame and the inner sides of the reciprocating slide-bars 13, and said plate-recesses are located at a point near the outer ends of the guide-slots 3 in the sides of the press-frame, so that the stop-plates 59 may be thrown directly in the path of movement of the shaft extremities 10 of the movable rolls 9, for the purpose to be explained.

Adapted to be removably and replaceably arranged between each of the movable or negative rolls 9 and the central fixed roll 5 is a core-rod 61. The core-rod 61 is spirally grooved substantially its entire length and is provided with reduced spindle extremities 62, on which are fitted the disk heads 63, which form guards for the ends of the bale formed around the core-rod, and one of the reduced spindle extremities 62 is threaded to removably receive thereon one of the disk heads 63, in order that after the removal of said disk head the rod may be readily unscrewed from the complete bale, as will be readily understood. The core-rods 61 are inserted in place between the rolls 9 and the roll 5 by passing the spindle extremities of such rods upward through the core-guiding grooves 64, formed in the opposite inner sides of the press-frame in a vertical plane and leading at their upper ends into the guide-slots 3 of the said frame sides. By passing the spindle extremities 62 of the core-rods upward through the guiding-grooves 64 the said spindle extremities of the core-rods will be readily carried into the guide-slots 3 of the frame sides, which form supporting-slots for the cores, while at the same time allowing for the play of the rolls 9, and at this point it will also be observed that the guiding-grooves 64 also allow the cores to drop from between the compressing-rolls when the rolls 9 have reached a point farthest from the central fixed roll 5, as clearly indicated in Fig. 3 of the drawings.

In operating the press the parts are so adjusted that one of the rolls 9 is disposed directly adjacent to the central fixed roll and against the core-rod 61 between these two rolls. As thus positioned the movable roll 9 and the roll 5 will rotate in the same direction and provide for the frictional rotation of the core-rod in an opposite direction, so that as the bat of cotton is fed between the fixed roll and the directly-adjacent movable roll the cotton will be tightly wrapped around the rotating core-rod and will continue to wrap therearound to form a compact cylindrical or roll bale, which constantly increases in size as the movable roll separates away from the fixed roll. It will be understood that during the formation of the roll-bale at one side of the fixed roll the movable roll at the opposite side of said fixed roll is not in operation, but is carried by the slide-bars 13, so as to constantly approach the fixed roll. As the bat of cotton accumulates on the core-rod the movable pressure-roll bearing against the said bat of cotton is gradually forced thereby away from the fixed roll; but the tendency of the said movable roll to separate or move away from the fixed roll is resisted with great pressure by the water or other liquid within the pressure-cylinders, so that the movable compressing-roll 9 will be held to any desired pressure against the constantly-growing bale.

It will be understood that as the movable roll 9, which is in operation, is forced by the growing bale away from the fixed roll 5 the slide-bars 13 will be moved in a direction to force the pistons 24 within the opposite pressure-cylinders toward one end of said cylinders, and during this travel of the pistons the connections 35 and 37 with the slide-bars 13 provide for sliding the weights 34 on the levers 31 toward the same end of the cylinders which the pistons 24 are approaching. This movement of the sliding weights 34 will provide for adjusting the valve-plugs 29, adjacent to the ends of the cylinders referred to, farther into the valve-openings 28 directly therebelow, which movement of the valve-plugs will provide for increasing the resistance offered to the outlet of the water from the water-chambers 35, into which it is forced by the moving pistons, thereby increasing the pressure of the movable roll against the roll-bale as it increases in size. By the time the roll-bale has reached its full growth the valve-plugs referred to will have completely and tightly closed the valve-openings directly therebelow, so as to stop further outward movement of the movable roll just in operation. At this point the rotation of the movable roll just in operation is stopped by disconnecting the clutch-collar 16 from the sprocket-wheel 14 for such movable roll, and one of the rock-shafts 40 is oscillated by manipulating the lever for such rock-shaft, thereby swinging the arms 37, carried by the slide-bars 13, so as to adjust the rods 35 in a direction which will carry the sliding weights 34 directly over the fulcrum or pivotal points of the oscillating valve-levers 31. This adjustment of the sliding weights 34 raises the valve-plugs, which have closed in the manner described, so that the valve-openings of both water-chambers for both pressure-cylinders will be uncovered, so that the water will immediately freely circulate into both ends of the cylinder, and thereby relieve the piston from pressure.

Immediately as the pistons within the pressure-cylinders have been relieved from pressure, as described, if the lower one of the movable rolls 9 was the roll just in operation, the weight of the upper inactive roll will carry the slide-bars 13 a further distance downward, there being no material resistance offered to the pistons, which further adjustment of the slide-bars will allow the lower movable roll 9 to jump away from the completed bale, so that such bale will be released from the compressing-rolls and will be allowed to drop out of the press-frame by having the spindle extremities of the core of such bale pass out of the guide-slots 13 and into the guiding-grooves 64 previously referred to. On the other hand, as the pistons within the pressure-cylinders have been relieved from pressure, as described, if the upper of said movable rolls 9 was the roll just in operation, it will be obvious that as the adjusting-lever 48 for the upper rock-shaft 40 is manipulated such adjusting-lever and the directly opposite tappet-arm 49 will move against the adjusting-pins 50 and will slide the bars 13 a sufficient distance upward to permit the movable roll to jump away from the completed bale in the manner referred to.

It will be understood that the adjusting-lever for the rock-shaft nearest the completed bale is the adjusting-lever which is manipulated at the completion of each bale, and at the moment such lever is adjusted it will be understood that the stop-plates 59 operated in connection with the rock-shaft of such lever will be adjusted downward into the plate-recesses 60 therefor, so that when the movable roll just in operation jumps away from the completed bale the shaft extremities 10 of such movable roll strike against the stop-plates 59 referred to, and thereby arrest the movement of the movable roll farther away from the fixed roll, in order that the movable roll will not have too great a play at this point in the operation, so as to interfere with the adjustment of any other parts of the press.

When either of the rock-shafts 40 is manipulated, the rod connections 53 with such rock-shafts will provide for simultaneously adjusting the position of the feed-spout 51 to provide for delivering the bat of cotton at the side of the central roll 5 opposite the side where a bale has just been completed, and at this point it will be further noted that during the interval that an inactive movable roll 9 is approaching the central fixed roll a core-rod 61 is inserted in place between the said inactive roll and the fixed roll, so that when such inactive roll reaches its inward limit of movement the clutch connection for such roll is manipulated so as to start the rotation thereof, and thereby start the formation of another bale. By reason of this operation one of the rolls 9 is in action at all times, whereby one bale is always being formed within the press.

Changes in the form, proportion, and the minor details of construction may be resorted to without departing from the principle or sacrificing any of the advantages of this invention.

Having thus described the invention, what is claimed, and desired to be secured by Letters Patent, is—

1. In a cotton-compress, a press-frame, a central fixed rotating compressing-roll mounted within said frame, reciprocatory slide-bars mounted at opposite sides of the frame, a rotary compressing-roll mounted at each side of said central roll and having its shaft extremities connected with the said slide-bars, the core-rods, and pressure mechanism connected with each of said slide-bars, substantially as set forth.

2. In a cotton-compress, a press-frame supported in an inclined position, a central fixed rotating compressing-roll mounted in said frame, reciprocatory slide-bars mounted at opposite sides of the frame, a pair of movable rotary compressing-rolls respectively mounted at opposite sides of the central roll and carried by said slide-bars, the core-rods, and pressure mechanism connected with each slide-bar, substantially as set forth.

3. In a cotton-compress, a press-frame provided in its opposite sides with oppositely-located longitudinally-disposed guide-slots, and with vertically-disposed core-guiding grooves leading into said slots, a central fixed rotating compressing-roll mounted within the frame, reciprocatory slide-bars mounted at opposite sides of the frame, a pair of movable rotary compressing-rolls respectively mounted at opposite sides of the central roll and having their shaft extremities connected with said slide-bars and working in the guide-slots in the frame side, a core-rod having spindle extremities adapted to work in said guide-slots at both sides of the central roll and to pass through said core-guiding grooves, and pressure mechanism connected with each slide-bar, substantially as set forth.

4. In a cotton-compress, a press-frame supported at an inclination, a central fixed rotating compressing-roll mounted in said frame, reciprocatory slide-bars mounted at opposite sides of the frame and each provided with longitudinally-disposed slots, a pair of movable rotary compressing-rolls respectively mounted at opposite sides of the central roll and carrying on their shaft extremities bearing-boxes slidably mounted in the slots of said slide-bars, the core-rods adapted to be removably supported between the central roll and each of said movable rolls, pressure mechanism connected with each slide-bar, and means for positively adjusting the slide-bars in an upward direction after the completion of a bale at the upper side of the central roll to allow the uppermost of said movable rolls to free itself from the completed bale, substantially as set forth.

5. In a cotton-compress, a press-frame supported at an inclination, a central fixed rotating compressing-roll mounted in said frame, reciprocatory slide-bars mounted at opposite sides of the frame, movable rotary compressing-rolls respectively mounted at opposite sides of the central roll, the shaft extremities of said movable rolls having slidable connections with said slide-bars, the core-rods, pressure mechanism connected with each slide-bar, and means for positively adjusting the slide-bars in an upward direction after the completion of the bale at the upper side of the central roll, substantially as set forth.

6. In a cotton-compress, a press-frame supported at an inclination, a central fixed rotating compressing-roll, reciprocatory slide-bars mounted at opposite sides of the frame and provided at their upper ends with adjusting-pins, movable rotary compressing-rolls respectively mounted at opposite sides of the central roll, the shaft extremities of said movable rolls having slidable connections with said slide-bars, the core-rods, pressure mechanism connected with each slide-bar, transverse rock-shafts mounted on the frame near its upper and lower ends and each of said shafts carrying a pair of short adjusting-arms, stop-plates pivotally connected to said short adjusting-arms and adapted to be adjusted across the path of movement of the shaft extremities of said movable rolls, adjusting-levers attached to each of said rock-shafts, the adjusting-lever for the upper rock-shaft forming a tappet-arm which engages with the adjusting-pin at the upper end of one of said slide-bars, and a tappet-arm mounted on one end of said upper rock-shaft and adapted to engage with the adjusting-pin for the other of said slide-bars, substantially as set forth.

7. In a cotton-compress, a press-frame, a central fixed rotating compressing-roll mounted in said frame, reciprocatory slide-bars mounted at opposite sides of the frame, a pair of movable rotary compressing-rolls respectively mounted at opposite sides of the central roll and carried by said slide-bars, the core-rods, oppositely-located pressure-cylinders mounted at one end of said frame and each provided with a pair of valves for controlling the passages into each end thereof, the pistons working within the pressure-cylinders and having rod connections with one end of said slide-bars, oscillating valve-levers pivotally supported at a central point and connected at their opposite ends with said valves, adjusting-rods having a suitable connection at one end with said slide-bars and carrying at their other ends sliding weights movable longitudinally on said valve-levers from end to end thereof, a swinging feed-spout pivotally supported over said central roll, and suitable adjusting mechanism operated from either end of the press-frame and having connections with said feed-spout and with said adjusting-rods to provide for simultaneously adjusting said spout and moving said sliding weights directly over the fulcrum or pivotal points of said valve-lever, substantially as set forth.

8. In a cotton-compress, a press-frame, a central fixed rotating compressing-roll, oppositely-located reciprocatory slide-bars carrying compressing-rolls respectively located at opposite sides of the central roll, the core-rods, oppositely-located pressure-cylinders having a circulating-pipe connection therewith and each provided with a pair of valves for controlling the passages into each end thereof, the pistons having rod connections with one end of said slide-bars, an oscillating valve-lever pivotally supported at a central point above each cylinder and connected at its opposite ends respectively with the separate valves for such cylinder, an arm pivotally connected at one end to each of said slide-bars, an adjusting-rod pivotally connected at one end to said arm and carrying at its other end a sliding weight movable longitudinally on the valve-levers from end to end thereof, a swinging feed-spout pivotally supported over the central roll, and separate rock-shafts mounted at opposite points on the frame and having slotted rod connections with the feed-spout and also with the pivoted arms carried by the slide-bars, substantially as set forth.

In testimony that I claim the foregoing as my own I have hereto affixed my signature in the presence of two witnesses.

THOMAS J. GRIFFIN.

Witnesses:
JOHN H. SIGGERS,
HAROLD H. SIMMS.